Figure 1:
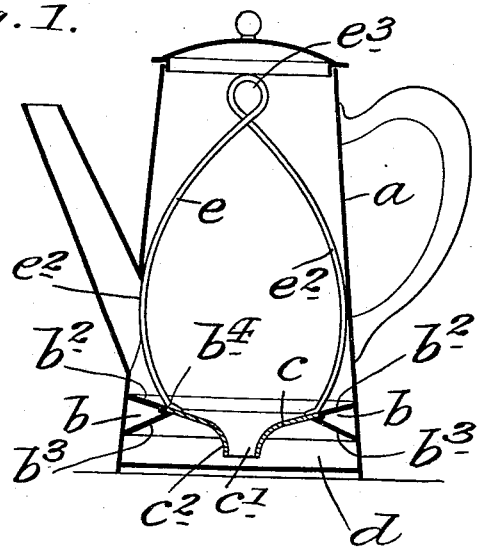

J. H. HUNTER & W. A. PALMER.
BOTTLE AND OTHER VESSEL.
APPLICATION FILED FEB. 4, 1908.

910,686.

Patented Jan. 26, 1909.

WITNESSES
C. E. Mulreany
M. C. Doody

INVENTORS.
John H. Hunter.
William A. Palmer.
BY Edgar Tate & Co.
ATTORNEYS.

THE NORRIS PETERS CO., WASHINGTON, D. C.

UNITED STATES PATENT OFFICE.

JOHN HAMILTON HUNTER AND WILLIAM ARTHUR PALMER, OF DUBLIN, IRELAND.

BOTTLE AND OTHER VESSEL.

No. 910,686.	Specification of Letters Patent.	Patented Jan. 26, 1909.

Application filed February 4, 1908. Serial No. 414,197.

*To all whom it may concern:*

Be it known that we, JOHN H. HUNTER and WILLIAM A. PALMER, subjects of the King of Great Britain, and residing at Dublin, Ireland, have invented certain new and useful Improvements in Bottles and other Vessels, of which the following is a specification, such as will enable those skilled in the art to which it appertains to make and use the same.

This invention relates to coffee pots and other vessels designed for holding liquids which require to be freed from sediment, and the invention consists of certain improvements in vessels of this class whereby said vessels are provided in the bottom thereof with chambers or supplemental receptacles in which the sediment collects, whereby the liquid in the top part of the receptacle may be poured out or otherwise removed therefrom clear and free of sediment, the sediment in the bottom or supplemental receptacle being also removable therefrom.

The invention is fully disclosed in the following specification, of which the accompanying drawing forms a part, in which the separate parts of our improvement are designated by suitable reference characters in each of the views, and in which;—

Figure 2:
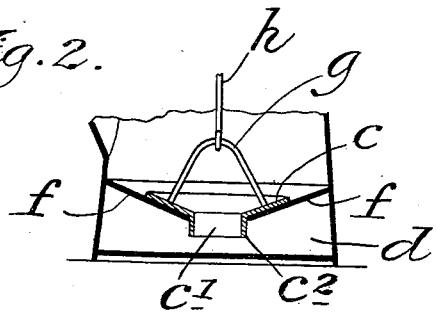

Figure 1 is a central vertical section of a vessel of the class specified provided with our improvement, and;—Fig. 2 a similar view showing the bottom portion of a receptacle with a modified form of construction.

In the practice of our invention as shown in the drawing, we provide a vessel $a$, the preferred form of which is shown in Fig. 1, and this vessel may be designed for use as a coffee pot or for any other purpose for which vessels of this class are usually employed, and if desired the said vessel may be formed to serve as a bottle or similar receptacle. In the bottom part of the vessel $a$ is placed, formed or secured an inwardly directed annular projection $b$ composed, in the form of construction shown, of a downwardly inclined top member $b^2$ and an upwardly inclined bottom member $b^3$, and the top member $b^2$ is provided at its inner edge with an annular depression $b^4$ on which is placed a removable plate $c$, the central portion of which is depressed or conical in form and provided with a central opening $c^1$ formed by a downwardly directed tubular extension $c^2$, and this forms in the bottom of the receptacle or vessel a supplemental chamber $d$. The plate $c$ is removable, and is provided with a spring wire handle $e$ composed of two side portions $e^2$ and formed into a loop the top part of which is provided with a handle member $e^3$, and the sides $e^2$ of which normally press on the opposite sides of the receptacle or vessel $a$ so as to frictionally engage the same and hold the plate $c$ in position, and by means of the handle $e$ said plate may be removed from the receptacle or vessel, or placed therein whenever desired. In this form of construction any sediment that collects in the bottom or supplemental chamber $d$ may be easily removed therefrom, at any time, by removing the plate $c$, and after the chamber $d$ has been thoroughly cleaned the said plate may be again inserted into the vessel or receptacle as shown in Fig. 1. The downwardly directed central tubular member $c^2$ of the plate $c$ serves, as will be understood, to prevent any considerable amount of sediment from passing back out of the supplemental chamber $d$ into the top portion of the vessel when said vessel is agitated, as in the pouring of coffee, or in pouring the contents of said vessel regardless of the form of the latter or the use thereof.

In Fig. 2 we have shown a modification in which the inwardly directed annular member $b$ consists of a downwardly inclined plate $f$, which is wider than the corresponding part shown in Fig. 1, and on which the plate $c$ rests, and the plate $c$ is provided with a yoke-shaped wire attachment $g$ to which a handle $h$ is secured, but the parts $g$ and $h$ may be of any desired form and may be the same as the parts $e$, $e^2$ and $e^3$ shown in Fig. 1 if desired; and it will be understood that the plate $c$ shown in Fig. 2 is removable the same as the corresponding plate shown in Fig. 1. With vessels formed, as above described, the liquid in a cloudy or muddy condition when poured in will gradually clear, the sediment falling down into the lower compartment $d$ which serves as a trap to contain the same, thus allowing the cleared liquid to be poured off.

The construction shown in Fig. 2 is not so convenient when it is desired to remove the sediment from the supplemental chamber $d$ as that shown in Fig. 1, but said sediment can be removed by filling the supplemental chamber $d$ with water and agitating the contents thereof and inverting the vessel, this operation being repeated until said chamber $d$ is free or practically free of sediment, and by making the part *f* horizontal instead of downwardly inclined the operation of removing the sediment will be simplified.

Having fully described our invention, what we claim as new and desire to secure by Letters Patent, is:—

1. A vessel of the class specified provided in the bottom portion thereof with an inwardly directed annular member having a central opening whereby a supplemental or sediment chamber is formed below said member, and a removable plate placed on said member and provided with a downwardly directed tubular extension, said removable plate being provided with a handle.

2. A vessel of the class specified provided in the bottom portion thereof with an inwardly directed annular member having a central opening whereby a supplemental or sediment chamber is formed below said member, and a removable plate placed on said member and provided with a downwardly directed tubular extension, said removable plate being provided with a handle which frictionally engages the opposite side walls of the top portion of the vessel.

In testimony that we claim the foregoing as our invention we have signed our names in presence of the subscribing witnesses this 24th day of January, 1908.

JOHN HAMILTON HUNTER.
WILLIAM ARTHUR PALMER.

Witnesses:
JAMES O'NEILL,
BRIDGET SHEEHY.